United States Patent [19]

Tokar

[11] Patent Number: 4,491,460
[45] Date of Patent: Jan. 1, 1985

[54] AIR CLEANER AND DEFLECTING INTAKE TUBE

[75] Inventor: Joseph C. Tokar, Apple Valley, Minn.

[73] Assignee: Donaldson Company, Inc., Minneapolis, Minn.

[21] Appl. No.: 462,456

[22] Filed: Jan. 31, 1983

[51] Int. Cl.³ .............................................. B01D 45/16
[52] U.S. Cl. ........................................ 55/337; 55/495; 55/508
[58] Field of Search ................. 55/337, 482, 495, 498, 55/505, 507, 508, DIG. 13, 204, 205; 210/327, 331, 487–489

[56] References Cited

U.S. PATENT DOCUMENTS

| | | | |
|---|---|---|---|
| 3,181,905 | 5/1965 | Bisbing | 292/109 |
| 3,243,941 | 4/1966 | Peterson | 55/204 |
| 3,329,276 | 7/1967 | Mouwen | 210/487 |
| 3,466,076 | 9/1969 | Bisbing | 292/109 |
| 3,745,753 | 7/1973 | Risse | 55/481 |
| 4,162,905 | 7/1979 | Schuler | 55/337 |
| 4,242,206 | 12/1980 | Estabrooke | 210/489 |

FOREIGN PATENT DOCUMENTS 0018168 10/1980 European Pat. Off. ............. 55/204

Primary Examiner—Charles Hart
Attorney, Agent, or Firm—Merchant, Gould, Smith, Edell, Welter & Schmidt

[57] ABSTRACT

An air cleaner and deflecting intake tube therefor. An air cleaner having a two-part housing (14,16) as a primary filter (54) and a secondary safety filter (52). Primary filter has a neck (66) which is compressed by clamp (86) upon sleeve (80) of the secondary filter. When the secondary filter is affixed to a machine it provides a filtering function whether or not the remainder of the filtering apparatus is present. Likewise, the primary filter functions properly without the housing present.

An intake tube (20) having a deflecting surface (122) causes an air flow (150) to have an axial and downward trajectory which, when used in combination with a cylindrical housing, produces a helical air flow resulting in centrifugal separation of heavy particulate matter. The primary filter (54) is preferably disposable.

1 Claim, 5 Drawing Figures

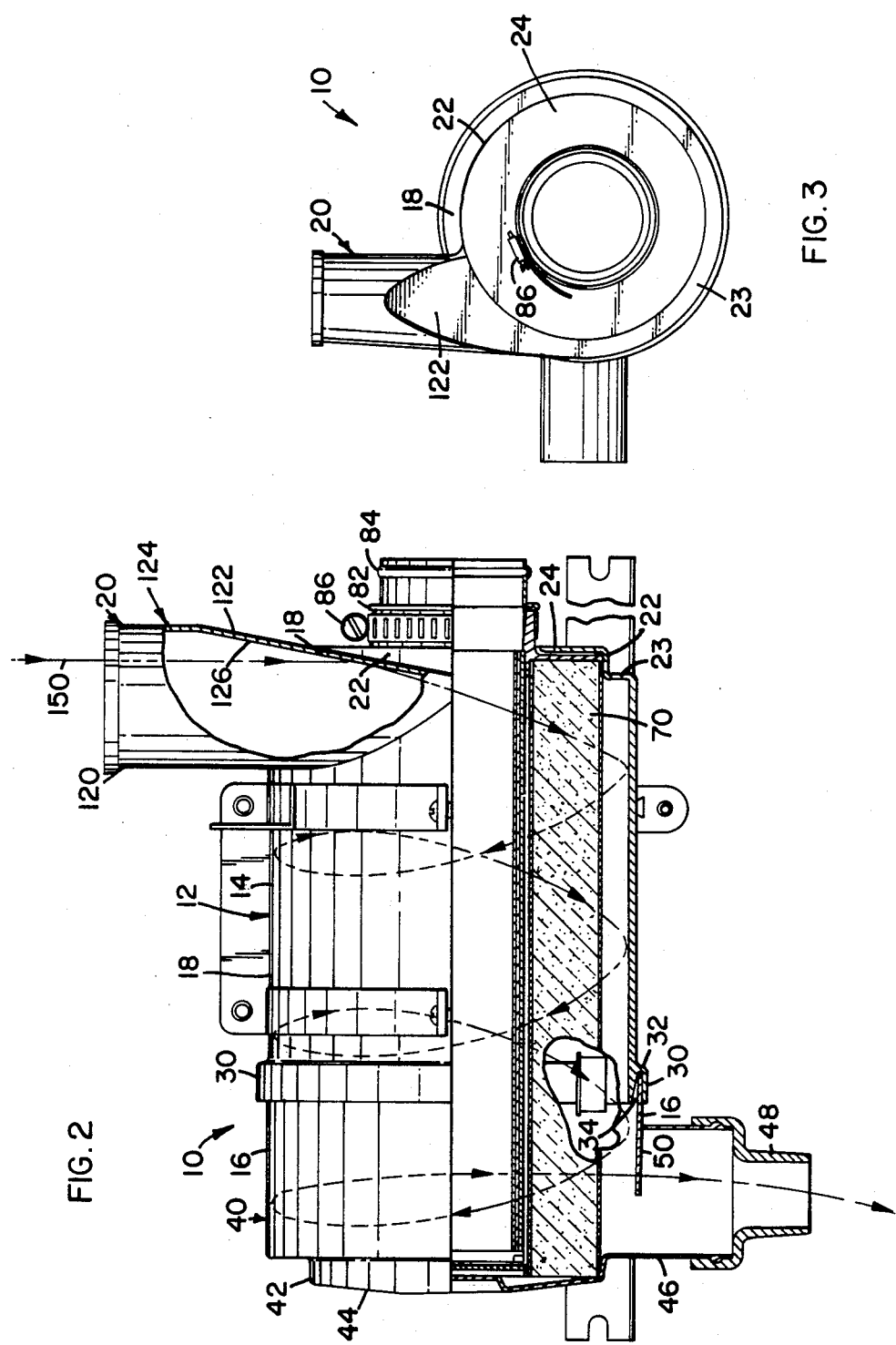

AIR CLEANER AND DEFLECTING INTAKE TUBE

TECHNICAL FIELD

The present invention relates to air filtering devices and components thereof, more particularly, a deflecting intake air tube for providing centrifugal separation, a housing to assist centrifugal separation and an air filter system operable independent of the housing.

BACKGROUND OF THE INVENTION

Traditionally, an air cleaner assembly may consist of an outer body assembly and a filter element assembly that fits inside. Usually the element assembly contains the filter media, liners and some kind of wire cover to support the filter media, and provisions for sealing the housing or body by means of gaskets.

The body assembly usually contains both an air inlet and outlet as well as hardware to support and seal the element assembly to the body. Usually nuts and bolts attach to a center yolk assembly. Air cleaners which contain two elements (primary and safety) usually have a complicated center yolk assembly which contains hardware necessary to compress each element independently. Such a system is shown in U.S. Pat. No. 3,745,753. In such a system, it is essential that the housing seals be airtight, otherwise the usefulness of the filter is entirely lost.

In rough service, such as on earth moving vehicles and trucks, the housing may be subjected to considerable abuse which may cause it to be damaged and lose the integrity of the seals. Furthermore, inexperienced users may change filter elements and improperly reinstall in the housings, thereby allowing particulate matter to bypass the filter and destroy expensive machinery.

The present invention overcomes the problem of complicated yolk assemblies while simultaneously eliminating the need for airtight housing seals.

As shown in U.S. Pat. No. 3,745,753, a ramp (54) can be provided to induce a helical air flow within the housing to achieve centrifugal separation of the heaviest particulate matter. Unfortunately, this ramp requires the housing to have increased diameter which adds to the cost and the overall size of the unit.

The present invention provides an intake tube which assists in producing the helical flow necessary for centrifugal separation without increasing the overall size of the housing.

BRIEF SUMMARY OF THE INVENTION

The present invention is, in one embodiment, directed to an intake tube for use with a cylindrically shaped air cleaner housing, the intake tube having deflector means therein for deflecting an inward air flow so that the flow has an axial component and a downward component thereby creating a downward helical air flow toward the distant end of the housing created when the air flow impinges on the cylindrical body of the housing.

In another embodiment and a further aspect of the invention, there is disclosed an air cleaner assembly for connection to a machine intake comprising a hollow cylindrical central element having first and second ends, the second end to be fitted to the intake port, the element having perforate and imperforate portions, the imperforate portions extending from the second end toward the first end, a cylindrical main filter element having first and second ends and a hollow axial core therebetween, the second end thereof having a central aperture therethrough to receive the central element, and further having a neck portion extending circumferentially therefrom at the central aperture, the first end thereof being fluid impervious and clamping means around the neck portion for compressing the neck portion on to the imperforate portion so that when the central element is inserted within the central aperture, the neck and the imperforate portion form a fluid impervious field therebetween.

BRIEF DESCRIPTION OF THE DRAWINGS

The specific embodiments of the invention have been chosen for the purpose of illustration and description and are shown in the accompanying drawings which form a part of the specification, wherein:

FIG. 2 is a side elevational view with portions broken away showing the air cleaner tube;

FIG. 3 is a top plan view of the subject matter of FIG. 2;

DETAILED DESCRIPTION OF THE INVENTION

Figure 1:
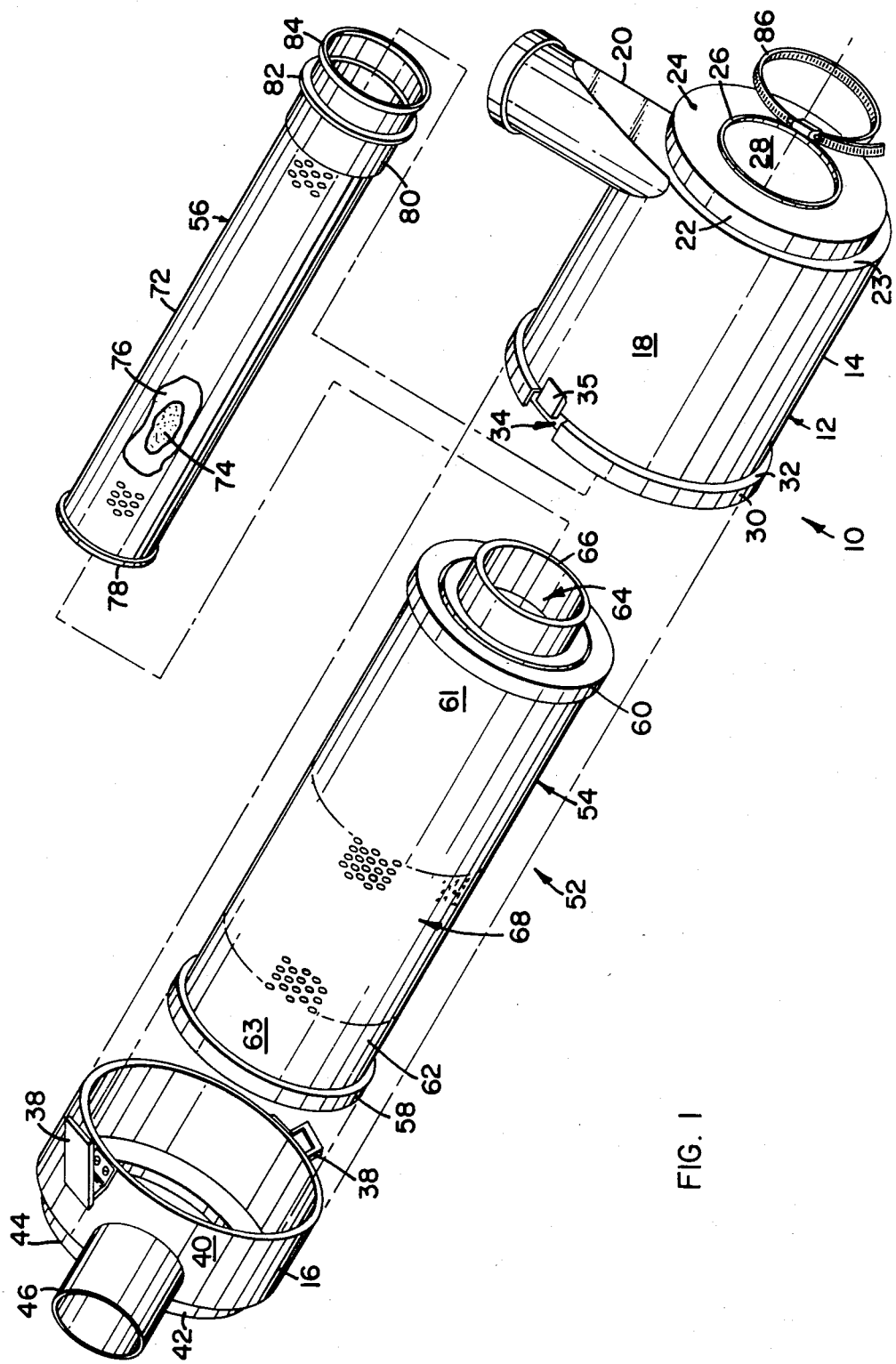
FIG. 1 is an exploded perspective view one embodiment of the air cleaner and intake tube.

In the drawings an air cleaner has been generally indicated at 10 having housing 12 generally having two cylindrical halves 14 and 16.

As can be seen most clearly in FIGS. 1 and 2 housing half 14 has a main cylindrical section 18, an intake tube 20 affixed thereto and having its central axis orthogonal to the central axis of cylindrical section 18, a cylindical portion 22 of lesser diameter, joined by a flat portion 23 to a disk shaped end portion 24 and a lip 26 extending from the inner periphery of aperture 28 and disk 24. At the other end of half 18 is a cylindrical portion 30 of greater diameter than the main body which is joined by member 32 to the main body in such as way as to define a space 34 between member 30 and the half 18.

Affixed at two points on the cylindrical half are studs 35 (only one visible) which form part of a clasp 38 which provide one means of joining the housing halves. These clasps are described in detail in U.S. Pat. Nos. 3,181,905 and 3,466,076 which are hereby incorporated by reference.

The other half 16 of the housing includes a main cylindrical portion 40, a cylindrical portion 42 corresponding to portion 22 on the other end, and a planar end member 44 corresponding to member 24 excepting that it has no aperture.

Extending outwardly from cylindrical portion 40 is a scavenge outlet 46 which may have a rubber or neoprene fitting 48 as shown in FIG. 2. When halves 16 and 18 are brought together it can be seen that the leading edge of half 16 engages the space 34, and under compression, forms an airtight seal, although this is not essential. As can also be seen in the cross-sectional view on FIG. 2, the aperture provided for scavenge outlet 46 is partially blocked by member 50 which extends into the opening leading to the scavenge outlet.

The filter assembly 52 includes a primary filter assembly 54 and a secondary or safety filter assembly 56.

Primary filter 54 is preferably constructed as follows. End caps 58 and 60 are preferably prepared of a urethane material which is slightly resilient. Cap 58 has no apertures and makes airtight contact with cylindrical member 62 which extends from one cap to the other. End cap 60 is similar to 58 except that it includes an aperture 64 sized to receive the main body of secondary filter 56 and has a neck portion 66 extending radially outwardly and circumferentially from the outer periphery of aperture 64. This neck is likewise made of a urethane, semi-compressible material. The outer diameter of neck 66 is sized to pass through aperture 28 in the housing.

Cylindrical member 62 is preferably made of a rigid material, either metal or plastic, and has perforate 68 and imperforate 61 and 63 regions. The perforate region is preferably located toward end 58 but not directly opposite the region which is visible through the scavenge outlet when the filter is assembled. The purpose of this feature will be explained hereinafter. It is, however, possible to make the entire member perforate. Under the perforate member is filter media 70 which is visible only in FIG. 2 and can be any filtering material normally used in the desired application. In this case, pleated filter media is preferred.

Secondary or safety filter 56 includes a cylindrical member 72 which is preferably made of a perforate rigid material such as metal or plastic. Underlying member 72 is a cylindrically shaped filter media 74 and in the preferred embodiment, an additional cylindrical member 76 also perforate. Members 72 and 76 provide support for the filter media 74, however, if media 74 is rigid enough, one of the cylindrical members or screens can be eliminated.

Affixed to one end of the cylindrical members is an end cap 78. At the other end, there is affixed a solid sleeve portion 80 which is bonded to cylindrical member 72 by adhesive or solder depending on the material. Sleeve 80 has a stop flange 82 affixed thereto, and at its distance end it has a raised bead 84 used to engage the intake of the machine upon which the filter is used.

A worm drive clamp 86 is provided to clamp neck 66 against sleeve 80. Aperture 28 in the housing is preferably large enough to admit this clamp.

The filter is assembled as shown in FIG. 2 with the two parts of the housing 14 and 16 coming together by means of clasps 38. The housing itself need not be airtight. Clamp 86 must be tightened around neck 66 which in turn abuts up against stop flange 82. When sleeve 80 is affixed to the intake of a machine, half 16 of the housing may actually be removed and the filter will perform satisfactorily, however it will not have a precleaning function. Primary filter 54 can be made disposable and is removed by merely loosening worm clamp 86 and replacing. Even if the integrity of primary filter 54 is destroyed by damage thereto, the filter system is still operative by a safety filter 56 which forms an airtight seal with the intake of the machine. Thus, even if the operator damages the housing or otherwise fails to install it correctly, and even if filter 54 is damaged, the engine is protected by a safety filter.

The safety filter 56 can be easily replaced, if desired, by disconnection from the machine and removal from the housing. Safety filter 56 can actually be replaced without opening the housing so long as worm clamp 86 has been loosened. Stop flange 82 prevents end 84 of the safety filter from extending too deeply into primary filter 54. Without the stop flange, it would be possible to damage end 58 of the primary filter by impact therewith.

Deflectng air intake tube 20 is shown most clearly in FIGS. 2 and 3. The tube is preferably cylindrical in shape at its distant end 120 and has an inclined planar portion 122 which extends from housing half 18 towad end 120. As can be seen in FIG. 3, the inner section between the cylindrical portion of tube 20 and the planar portion 122 preferably forms a elliptic-like shape. It can also be seen that planar portion 122 follows the curvature of cylindrical portion 22 at its point of contact. Note also that the intake tube is "offset" toward end plate 24. This allows for the maximum utilization of the full length of the housing to produce a helical flow. Specifically, the plane defined as being tangent to the outer edge 124 of the intake tube as shown on the drawing to be positioned to the left of (as oriented in FIG. 2) a plane defined by surface 23.

In operation, air would enter intake tube 20 as shown by arrow 150. Some of the air would impinge upon the inner surface 126 of the deflecting member and following a trajectory, shown by the arrow, which has axial and downward components. When the air flow impinges the curved inner surface of the housing, a portion of it will be deflected into a circular pattern. This additional component will produce a helical flow as shown. When the flow reaches the lower end of the filter (and it is assumed that the preferred orientation of the filter has the scavenge outlet at the lower end) the heaviest particulate matter will not have been drawn into the primary filter 54 and it will be blown out the scavenge outlet. Baffle plate 50 prevents this from occuring except at the very lowest portion of the housing.

As explained earlier, cylindrical member 62 of the primary filter 54 has a perforate region 68. The upper end (closest neck 66) is not perforated so as to set up sufficient centrifugal force in the helical flow before the flow encounters the low pressure region in the perforate region 68. It is assumed that the heaviest particulate matter will have sufficient momentum so as not to be taken into the primary filter. The region closest end 58 is also not perforated so that particulate matter flowing toward the bottom will certainly be ejected at the scavenge outlet.

ALTERNATE EMBODIMENT

Figure 4:
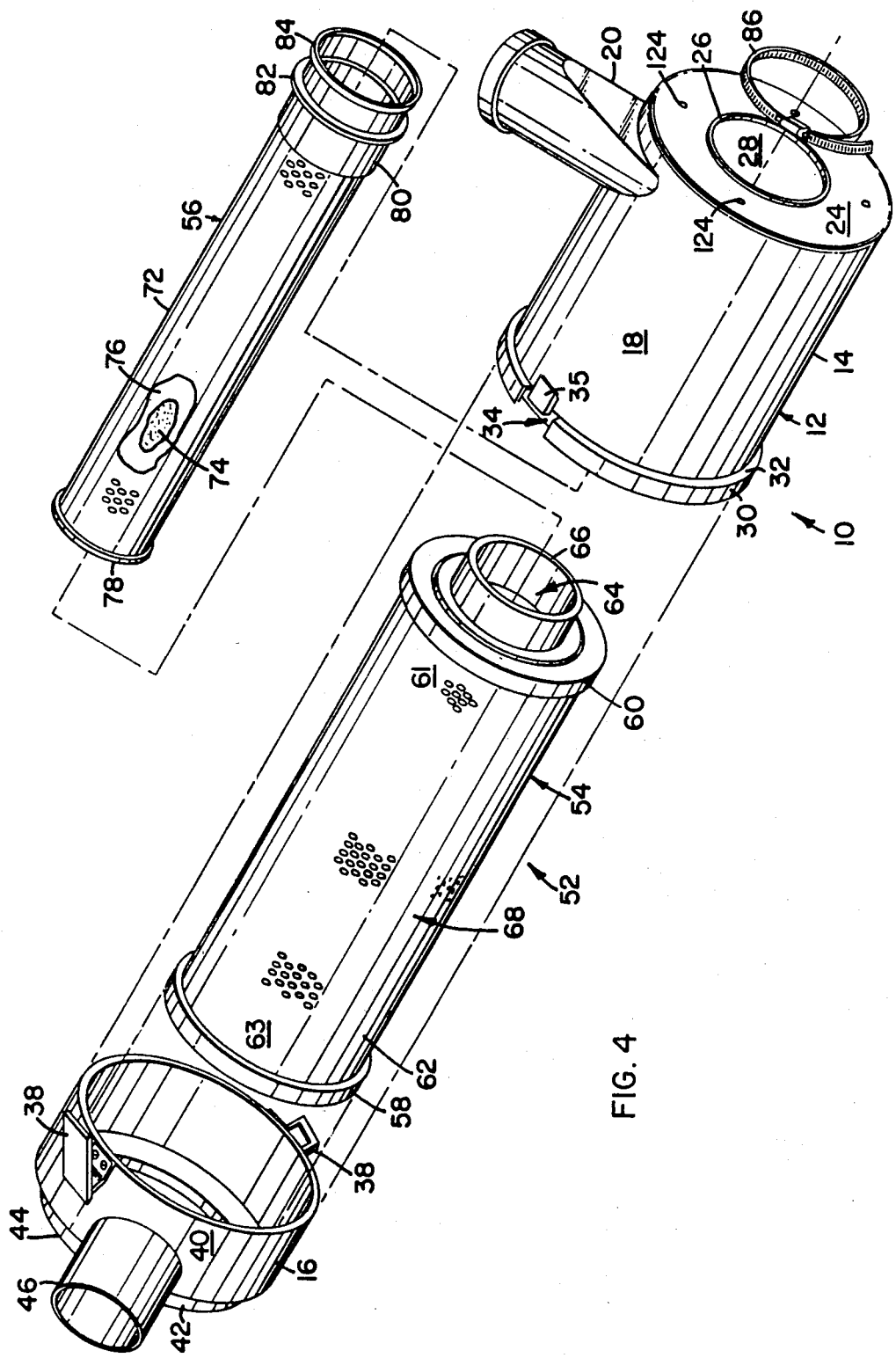
FIG. 4 is a view like FIG. 1 of an alternate embodiment.
Figure 5:
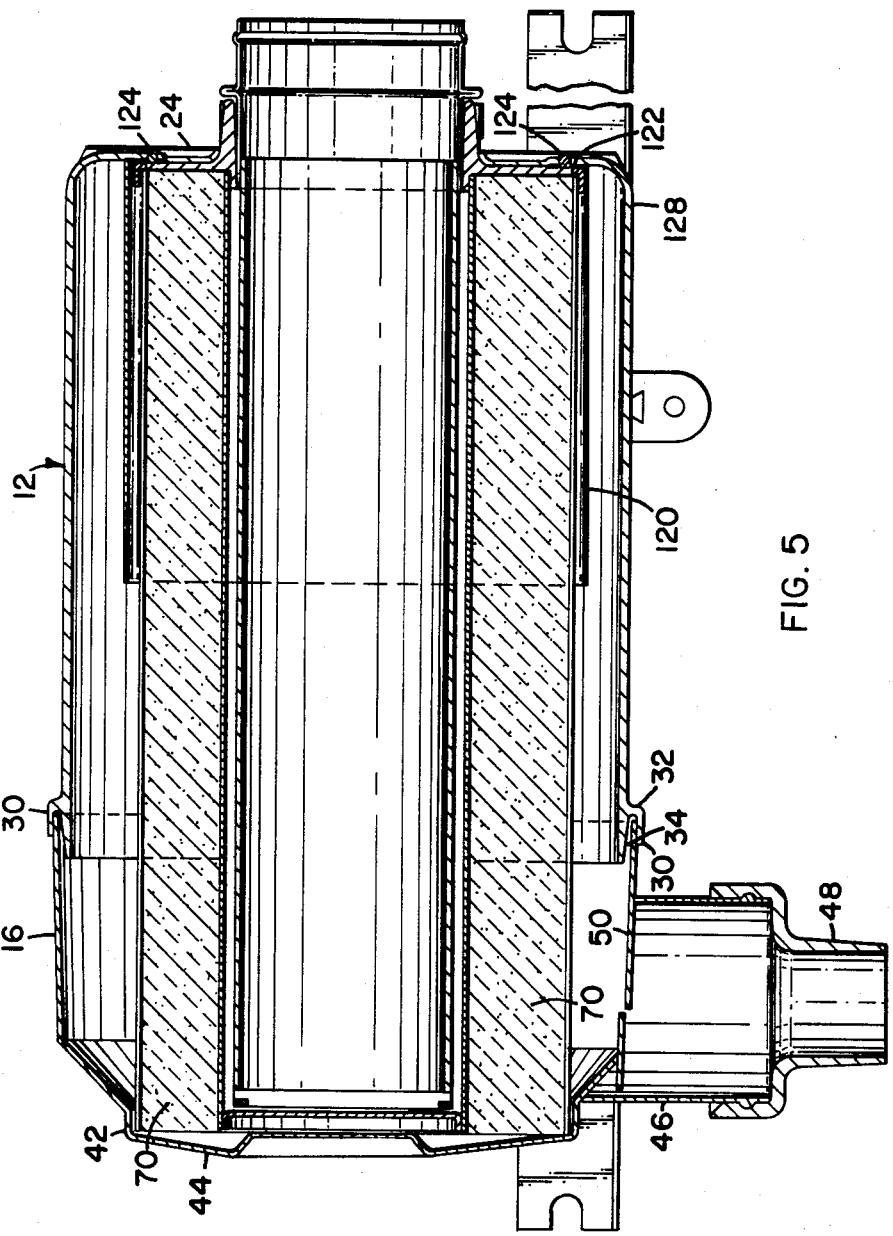
FIG. 5 is a top plan view with portions broken away of an alternate embodiment.

An alternate embodiment to that shown in FIGS. 1-3 is disclosed in FIGS. 4 and 5. To the extent parts are the same, the numerals are left unchanged. Specific reference is made to the different parts below.

As an alternative to providing an imperforate region 61 for the reasons specified above, it is possible to achieve a similar result with a filter 54 having perforations in region 61 by the addition of a sleeve 120 in the housing. As shown in FIG. 5 sleeve 120 preferably comprises a cylindrical shell extending approximately midway through the length of the housing and being affixed at end 24 thereof. Sleeve 120 is affixed by means of a circumferential ridge 122 which has projections 124 which pass through like holes in end 24 of the housing and can be deformed to create a rigid connection. As an alternative to projections 124, other fastening means may be provided. The diameter of sleeve 120 is preferably such that it is only slightly larger than the outer diameter of end cap 60 to effectively shield the primary filter 54 in region 61.

The alternate embodiment also differs from the first embodiment in the elimination of cylindrical portion 22 and flat portion 23 which are no longer necessary in view of sleeve 120. Elements 22 and 23 provided a "seat" for the end 60 to be received. Those elements are replaced in the alternate embodiment, by curved portion 128 which provides slightly improved airflow in the housing in that region.

Numerous characteristics and advantages of the invention have been set forth in the foregoing description together with the details and structure and the function of the invention. Novel features thereof are pointed out in the appended claims. The disclosure, however, is illustrative only and changes may be made in detail, especially in matters of size, shape, arrangement of parts, within the principal of the invention to the full extent intended by the broad general meaning of the terms in which the appended claims are expressed. It is understood, that the present invention can be practiced either as a combination of elements as disclosed and claimed or as an air deflecting intake tube for use with alternate forms of housings to produce the desired result, as claimed.

What is claimed is:

1. An air cleaner assembly for connection to a machine intake comprising:
   (a) a rigid hollow cylindrical central element having first and second ends, said second end to be fitted to a machine intake, said element having perforate and imperforate portions, said imperforate portion extending from said second end toward said first end, said imperforate portion including a stop flange extending circumferentially and outwardly from said element, said perforate portion having a safety filter element affixed thereto,
   (b) a cylindrical main filter element having first and second ends and an axial hollow core therebetween, said second end having a central aperture therethrough sized to receive said central element, said second end of said main filter having a neck portion extending circumferentially therefrom at said central aperture, said first end being fluid impervious, said filter element including an outer covering member having perforate and imperforate portions, said imperforate portions extending from both ends leaving a middle, perforate portion,
   (c) clamping means around said neck portion for compressing said neck portion onto said imperforate portion of said stop flange so that when said central element is inserted within said central aperture, said neck and said imperforate portion of said central element form a fluid impervious seal therebetween and said stop flange limiting the contact of said first ends of said elements, and
   (d) a housing for said main filter having two ends and including an intake port toward one end thereof, an outlet port sized to receive said second end of said central element and a scavenge port located toward the other end thereof, said housing being larger in diameter than said main filter thereby defining a space between said main filter and said housing, said intake port having a generally circular opening including an intake tube having a central axis being generally orthogonal to the central axis of the elements and affixed to said housing at one end thereof, said intake tube including a planar portion extending outwardly from the end having said outlet for causing intake air to be deflected into a helical orbit within said defined space, so that heavier particulate matter will be centrifugally separated and fall toward said scavenge port, said housing being removable to permit replacement of said main filter contained therein.

* * * * *